United States Patent
Young et al.

(10) Patent No.: US 7,624,452 B2
(45) Date of Patent: Nov. 24, 2009

(54) AUTOMATIC DEVICE CONFIGURATION USING REMOVABLE STORAGE

(75) Inventors: Joel K. Young, Eden Prairie, MN (US); Michael L. Zarns, Plymouth, MN (US)

(73) Assignee: Digi International, Minnetonka, MN (US)

(*) Notice: Subject to any disclaimer, the term of this patent is extended or adjusted under 35 U.S.C. 154(b) by 797 days.

(21) Appl. No.: 10/969,231

(22) Filed: Oct. 20, 2004

(65) Prior Publication Data
US 2006/0085632 A1 Apr. 20, 2006

(51) Int. Cl.
*H04L 21/00* (2006.01)

(52) U.S. Cl. ........................................... 726/30

(58) Field of Classification Search ................ 713/172, 713/2, 1; 726/30
See application file for complete search history.

(56) References Cited

U.S. PATENT DOCUMENTS

| 5,579,522 | A | * | 11/1996 | Christeson et al. ............ 713/2 |
| 6,167,532 | A | * | 12/2000 | Wisecup ...................... 714/23 |
| 6,178,503 | B1 | * | 1/2001 | Madden et al. ................ 713/2 |
| 6,223,284 | B1 | * | 4/2001 | Novoa et al. ................ 713/100 |
| 6,480,146 | B1 | | 11/2002 | Ferrandis et al. |
| 6,920,553 | B1 | * | 7/2005 | Poisner ......................... 713/2 |
| 7,136,951 | B2 | | 11/2006 | Deng et al. |
| 7,308,570 | B2 | | 12/2007 | Young et al. |
| 2002/0169976 | A1 | * | 11/2002 | Schelling et al. ............ 713/200 |
| 2006/0031544 | A1 | | 2/2006 | Dirstine |
| 2006/0085631 | A1 | | 4/2006 | Young et al. |

OTHER PUBLICATIONS

Xilinx "System ACE CompactFlash Solution," Advance Product Specification, Apr. 5, 2002.*
"U.S. Appl. No. 10/969,232—Non-Final Office Action mailed Jan. 29, 2007", 6 pgs.
"U.S. Appl. No. 10/969,232—Comments on Statement of Reasons for Allowance filed Aug. 22, 2007", 2 pgs.
"U.S. Appl. No. 10/969,232—Response filed Jun. 29, 2007 to Non-Final Office Action mailed Jan. 29, 2007", 12 pgs.
U.S. Appl. No. 10/969,232, Notice of Allowance mailed Aug. 9, 2007, 7 pgs.

* cited by examiner

*Primary Examiner*—Andrew L Nalven
(74) *Attorney, Agent, or Firm*—Schwegman, Lundberg & Woessner, P.A.

(57) ABSTRACT

A system and method of configuring an embedded system from removable media. The removable media is connected to the embedded system and the embedded system determines if the removable media includes a configuration key. If the removable media includes a configuration key, the embedded system determines if the configuration key includes configuration data applicable to the embedded system and, if the removable media includes a configuration key and the configuration key includes configuration data applicable to the embedded system, the embedded system applies the configuration data to the embedded system.

14 Claims, 2 Drawing Sheets

AUTOMATIC DEVICE CONFIGURATION USING REMOVABLE STORAGE

CROSS-REFERENCE TO RELATED APPLICATIONS

This application is related to U.S. patent application Ser. No. 10/969,232, entitled "SYSTEM AND METHOD FOR BOOTING EMBEDDED SYSTEMS USING REMOVABLE STORAGE", filed on even date herewith, which is incorporated herein by reference.

BACKGROUND OF THE INVENTION

1. Field of the Invention

The present invention is related to embedded computer systems, and more particularly to a system and method for configuring embedded systems using removable storage.

2. Background Information

Embedded systems range from low-end systems such as networked sensors and smart cards to high-end systems such as routers, storage servers and web servers. One of the most cumbersome challenges of embedded device deployment is the initial and subsequent configuration.

Mechanisms exist in the world for active configuration of devices by connecting a local PC or PDA to a port and entering a series of special commands or doing the same over a network connection. Unfortunately, when a device needs to be replaced or initially deployed into a network environment, it cannot be just taken out of the box and deployed. Although DHCP and other mechanisms provide a vehicle to get a network address, oftentimes there is no way to find the device and its address without manual intervention. To counter this problem, some devices are preprogrammed with a "phone home" address to query for instructions on power up. However, this still doesn't solve the identification problem.

For example, a factory has a network of industrial 10 devices for a production line. Each device is on a network. The devices are for the most part duplicates in hardware, but are involved in different control functions. During the late shift, one of the devices fails and needs to be replaced. The ideal replacement model would be for the maintenance department to grab a new device, plug it in, and let it configure itself. The problem is that unless the device location and ID is programmed into the device ahead of time, this is not possible.

One could get over this problem by pre-configuring a spare device at each location, but this tends to drive up inventory and cost. If, however, the maintenance person can pull a spare, plug it in, and configure it, then the network could do the rest.

What is needed is a system and method of configuring an embedded device which addresses these problems and other problems which will become evident in the detailed discussion below.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

In embedded systems, software is typically loaded on nonvolatile memory (such as flash memory). The memory is tightly coupled to the system bus. This is done because the processor only knows to get its boot information from interfaces defined within the chip. In order to get the boot code into the flash, the chip must by programmed ahead of time using a programmer or new code must be loaded using a debugger interface. The flash may also be downloaded by other code currently running, but this then requires a reboot.

To date, embedded systems have had limited access to external memory. One reason for limiting access to external memory was to reduce cost. Another reason was to limit the opportunities to compromise the embedded device. Such limits have their cost. For instance, it can be difficult to swap in a new software system on an embedded device. And it can be difficult to recover a embedded system that has been disabled by an error, or by compromised code.

Figure 1:
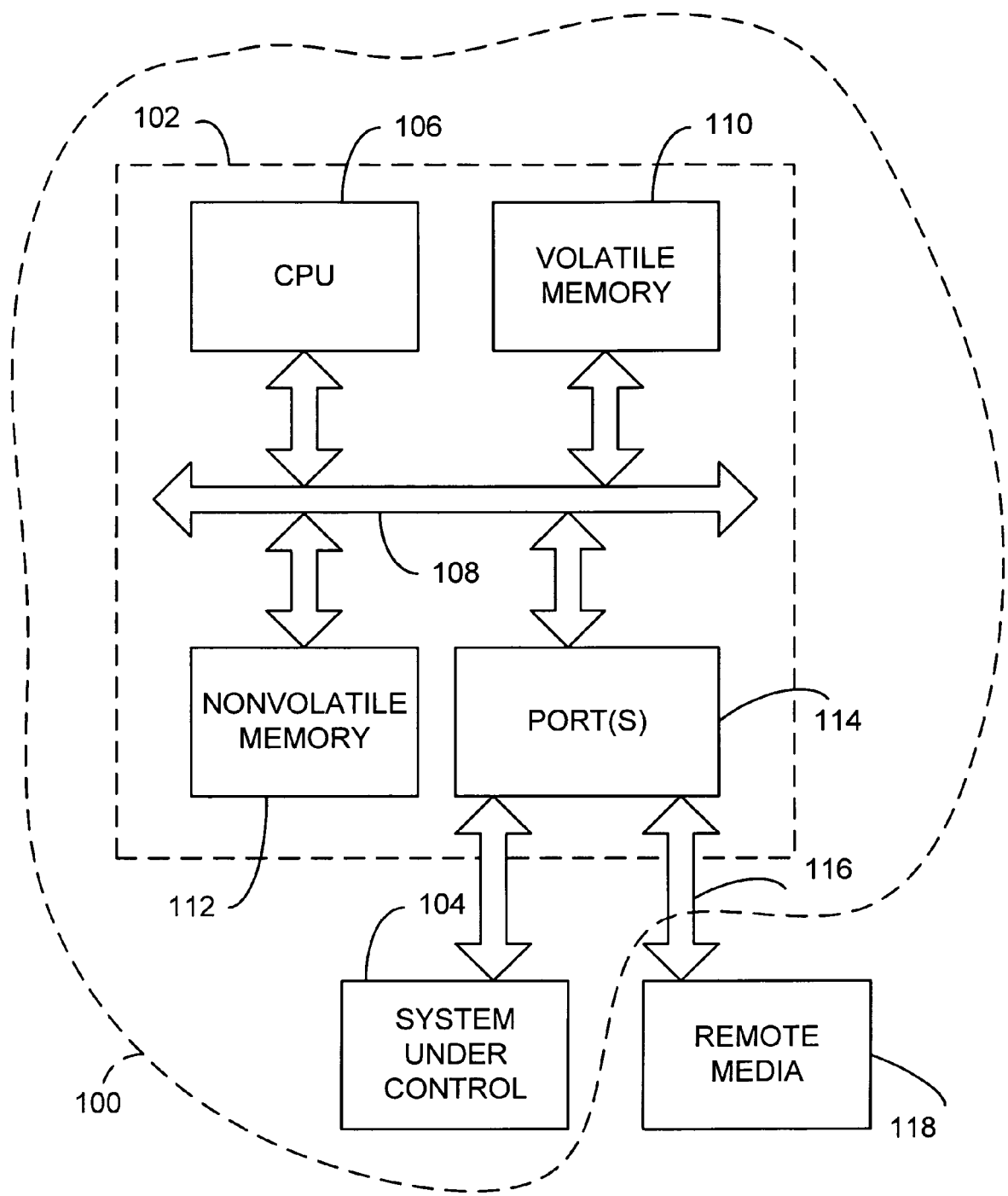
FIG. 1 illustrates an embedded system according to the present invention.

An embedded system 100 which addresses the above problems is shown in FIG. 1. In embedded system 100, a microcontroller 102 is connected to a system 104 which is being monitored or controlled. Microcontroller 102 includes a CPU 106 connected across a bus 108 to volatile memory 110, nonvolatile memory 112 and port(s) 114. Ports 114 include a removable media interface 116.

In today's world, flash storage is available with a CF (Compact Flash) and USB interface. These are used today for additional storage after the embedded operating system and application is up and running. System 100 combines the notions of removable flash storage and device configuration such that a system's configuration can be initiated and managed from a remote storage device (USB, CF, etc.). In this way, the software system, including the operating system, can be configured, changed and modified using interchangeable and easily removable hardware components.

In one embodiment of the present invention, an embedded device is configured automatically through the insertion or connection of a removable storage device. Configuration may be at a number of different levels from (a) providing the unit a device name or identifier, (b) providing a network address and other routing information, (c) providing a complete or partial configuration of all unit parameters, (d) providing instructions for phoning home to get additional information or (e) providing a complete download of executable instructions (or firmware).

In one embodiment, removable media interface 116 is a configuration port configured to communicate with removable media 118 containing non-volatile memory. Removable media 118 may be a storage device selected from nonvolatile memory such as battery powered RAM, Flash, ROM, and EPROM. In one such embodiment, configuration port 116 communicates with removable media 118 through a communications protocol such as USB, serial, or Compact Flash.

In one embodiment, removable media 118 contains configuration information used to configure embedded system 100. In one such embodiment, configuration data is stored in the format described in U.S. Patent application Ser. No. 10/873,051, entitled "Device Server access Using a Data-Type Aware Markup Language", filed Jun. 22, 2004 and assigned to the assignee of the present invention, the disclosure of which is incorporated herein by reference.

Figure 2:
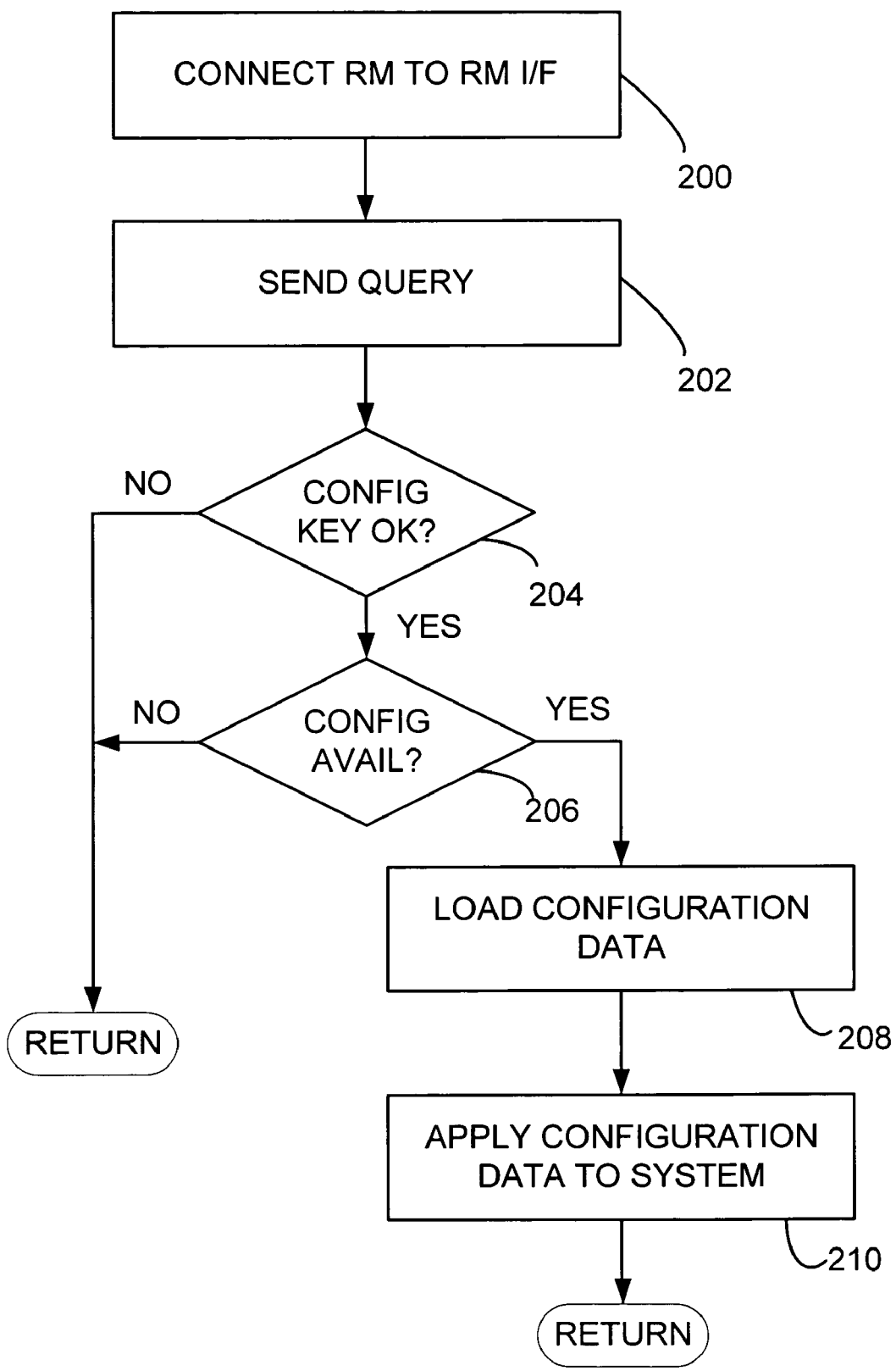
FIG. 2 illustrates a method of loading configuration information according to the present invention.

In one embodiment, configuration information is transferred from removable media 118 to system 100 using the method shown in FIG. 2.

In the method shown in FIG. 2, at 200 removable media 118 is communicatively coupled to removable media interface 116 (i.e., the "configuration port"). System 100 recognizes that something has been connected to the configuration port and, at 202, system 100 sends a query requesting a configuration key to removable media 118 across removable media interface 116. (Note that since the configuration port may also be used for other purposes, the application device does not yet know that the connection is for configuration). The configuration key is used to signal the application device that removable media 118 has been connected for the purpose of configuration.

At 204, system 100 checks the configuration key. If a configuration key has been returned, system 100 verifies as a function of the configuration key that that removable media 118 is (a) compatible and (b) has proper authorization. Control then moves to 206, where system 100 determines the type of configuration that is available. Note that a configuration adapter may house a number of configurations for different units and types.

If the device is allowed to accept that type of configuration, the appropriate configuration file is downloaded at 208. Note that one of the embedded devices may be setup at different times to accept different types of configurations—for example, if it is fresh out of the box, it may require complete configuration, included firmware download. Otherwise, it may only accept a new set of parameters, etc.

After downloading the configuration, it is applied to system 100 at 210. In one embodiment, when successful, system 100 powers down the port, signaling the user that removable media 118 may be disconnected from removable media interface 116, making the interface available for other uses.

A variety of approaches could be used to establish configuration keys. System 100 can used pre-shared keys, shared keys, private key/public key exchange as well as just exchanging a simple, unencrypted password. In any event, the notion is that a "password" is passed and encrypted. In one embodiment, certificates are used. Such an approach, however, can become too cumbersome.

Another notion about security is the ability to authenticate different levels or types of configuration. For example, some might only have authority to provide an ID update, while others can perform a complete firmware download. In one embodiment, this is done via permissions on user IDs. In one such embodiment, the permissions extend to the ability to completely restrict certain types of updates for the device, effectively turning off certain types of updates.

Portions of the above description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Examples of articles comprising computer readable media are floppy disks, hard drives, CD-ROM or DVD media or any other read-write or read-only memory device.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of configuring an embedded system from removable media, wherein the embedded system includes a microcontroller, the method comprising:
   connecting the removable media to the embedded system, wherein the removable media includes a plurality of different configuration files, wherein each configuration file is associated with a different embedded system;
   determining, via the microcontroller, whether the removable media also includes a configuration key;
   if the removable media includes a configuration key, authenticating the removable media based on the configuration key using the microcontroller;
   if the removable media is successfully authenticated based on the configuration key, determining, via the microcontroller, whether any of the different configuration files included in the removable media are applicable to the embedded system to which the removable media is connected;
   if the removable media includes a configuration file that is applicable to the embedded system, applying the applicable configuration file to the embedded system; and
   otherwise, ignoring the removable media.

2. The method according to claim 1, wherein authenticating the removable media based on the configuration key includes reading a password stored on the removable media.

3. The method according to claim 1, wherein the different configuration files include two or more versions of configuration data applicable to the embedded system and wherein applying the applicable configuration file to the embedded system includes determining which of the two or more versions of configuration data, if any, to apply to the embedded system.

4. The method according to claim 3, wherein determining which of the two or more versions of configuration data to apply to the embedded system includes asking a user to select the version of configuration data to apply to the embedded system.

5. The method according to claim 3, wherein determining which of the two or more versions of configuration data to apply to the embedded system includes asking a user to select the version of configuration data to apply to the embedded system and defaulting to a predefined version if the user does not respond within a predefined amount of time.

6. The method according to claim 1, wherein the different configuration files include two or more types of configuration information, wherein applying the applicable configuration file to the embedded system includes determining if one or more of the types of configuration information is applicable to the embedded system to which the removable media is connected.

7. An article comprising a computer readable medium having instructions thereon, wherein the instructions, when executed in a computer, cause the computer to execute the method of claim 1.

8. An embedded system having enhanced configuration capability, comprising:
   a processor;
   memory communicatively coupled to the processor, wherein the memory includes volatile and nonvolatile memory; and
   a removable media interface;
   wherein the processor:
      accesses removable media through the removable media interfaces, wherein the removable media includes a plurality of different configuration files, wherein each configuration file is associated with a different embedded system;
      determines whether the removable media also includes a configuration key;
      if the removable media includes a configuration key, authenticates the removable media based on the configuration key;
      if the removable media is successfully authenticated based on the configuration key, determines whether any of the different configuration files included in the removable media are applicable to the embedded system to which the removable media is connected;
      if the removable media includes a configuration file that is applicable to the embedded system, extracts the applicable configuration file from the removable media and applies it to the embedded system; and
      otherwise, ignores the removable media.

9. The embedded system of claim 8, wherein the processor reads a password stored on the removable media in authenticating the removable media based on the configuration key.

10. The embedded system of claim 8, wherein the processor distinguishes between two or more types of a configuration file.

11. A configuration key for an embedded system, wherein the embedded computer system includes a microcontroller, the configuration key comprising:
    interface means for communicatively coupling the configuration key to an embedded system; and
    configuration key memory connected to the interface means, wherein the configuration key memory includes a configuration key identifier and a plurality of different configuration files, wherein each configuration file is associated with a different embedded system;
    wherein the configuration key is authenticated by the microcontroller using the configuration identifier and wherein, upon determination by the microcontroller that any of the different configuration files are applicable to the embedded system to which the configuration key is connected, the applicable configuration file is downloaded to the embedded system via the interface means.

12. The configuration key according to claim 11, wherein the configuration key memory includes means for authenticating the configuration key to the embedded system.

13. The configuration key according to claim 11, wherein the different configuration files include two or more versions of configuration data applicable to the embedded system.

14. The configuration key according to claim 13, wherein the configuration key memory further includes program code for execution by the embedded system, wherein the program code includes program code for determining which of the two or more versions of configuration data to apply to the embedded system.

* * * * *

UNITED STATES PATENT AND TRADEMARK OFFICE
CERTIFICATE OF CORRECTION

PATENT NO. : 7,624,452 B2  Page 1 of 1
APPLICATION NO. : 10/969231
DATED : November 24, 2009
INVENTOR(S) : Joel K. Young et al.

It is certified that error appears in the above-identified patent and that said Letters Patent is hereby corrected as shown below:

In column 1, line 37, delete "10" and insert -- I/O --, therefor.

In column 5, line 18, in Claim 8, delete "interfaces," and insert -- interface, --, therefor.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO.      : 7,624,452 B2                                        Page 1 of 1
APPLICATION NO. : 10/969231
DATED           : November 24, 2009
INVENTOR(S)     : Young et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1161 days.

Signed and Sealed this

Twenty-sixth Day of October, 2010

David J. Kappos
*Director of the United States Patent and Trademark Office*